(12) United States Patent
Virgilio

(10) Patent No.: US 10,189,352 B2
(45) Date of Patent: Jan. 29, 2019

(54) INTELLIGENT SAFETY SYSTEM FOR VEHICLES

(71) Applicant: Savino Virgilio, Bitetto (IT)

(72) Inventor: Savino Virgilio, Bitetto (IT)

( * ) Notice: Subject to any disclaimer, the term of this patent is extended or adjusted under 35 U.S.C. 154(b) by 0 days.

(21) Appl. No.: 15/556,290

(22) PCT Filed: Mar. 4, 2016

(86) PCT No.: PCT/IB2016/051244
§ 371 (c)(1),
(2) Date: Sep. 6, 2017

(87) PCT Pub. No.: WO2016/139639
PCT Pub. Date: Sep. 9, 2016

(65) Prior Publication Data
US 2018/0056784 A1   Mar. 1, 2018

(30) Foreign Application Priority Data
Mar. 5, 2015   (IT) .............................. BA2015A0017

(51) Int. Cl.
| | |
|---|---|
| *B60K 28/06* | (2006.01) |
| *B60K 28/02* | (2006.01) |
| *B60R 21/01* | (2006.01) |
| *B60R 21/015* | (2006.01) |
| *B60K 28/04* | (2006.01) |
| *B60R 21/0134* | (2006.01) |
| *B62D 41/00* | (2006.01) |
| *G01S 17/93* | (2006.01) |
| *G07C 5/08* | (2006.01) |

(Continued)

(52) U.S. Cl.
CPC ............ *B60K 28/066* (2013.01); *B60K 28/02* (2013.01); *B60K 28/04* (2013.01); *B60R 21/01* (2013.01); *B60R 21/0134* (2013.01); *B60R 21/01516* (2014.10); *B62D 41/00* (2013.01); *G01S 17/936* (2013.01); *G07C 5/085* (2013.01); *B60R 2021/01027* (2013.01); *B60R 2021/01081* (2013.01); *B60R 2021/01286* (2013.01); *B60R 2021/01315* (2013.01); *G01W 1/02* (2013.01)

(58) Field of Classification Search
CPC ................................. A61B 5/00; A61B 5/681
USPC ......................................................... 340/438
See application file for complete search history.

(56) References Cited

U.S. PATENT DOCUMENTS 8,874,301 B1 * 10/2014 Rao ...................... B60K 28/066
180/272
2008/0316055 A1 * 12/2008 Bachelder ................. F41G 9/00
340/906

(Continued)

*Primary Examiner* — Fabricio R Murillo Garcia
(74) *Attorney, Agent, or Firm* — Abelman, Frayne & Schwab

(57) ABSTRACT

A safety and emergency-assistance system (1) for vehicles, constituted by at least one bracelet (E), a means for radio/telecommunication of the alarm signal (R1), a black box (BB), a plurality of sensors (S1, S2, S3, S4), and means (X) for remote automatic driving and management of the vehicle (A). In the case of emergency, with the driver/passenger present (A) and unwell while the vehicle is stationary with the engine off and without the key inserted into the ignition, or with the key inserted and the instrument panel off. The system (1) also enables automatic and autonomous activation of the devices present on board the vehicle, e.g. airbags, power window, and air-conditioning system.

18 Claims, 3 Drawing Sheets

Figure 1:
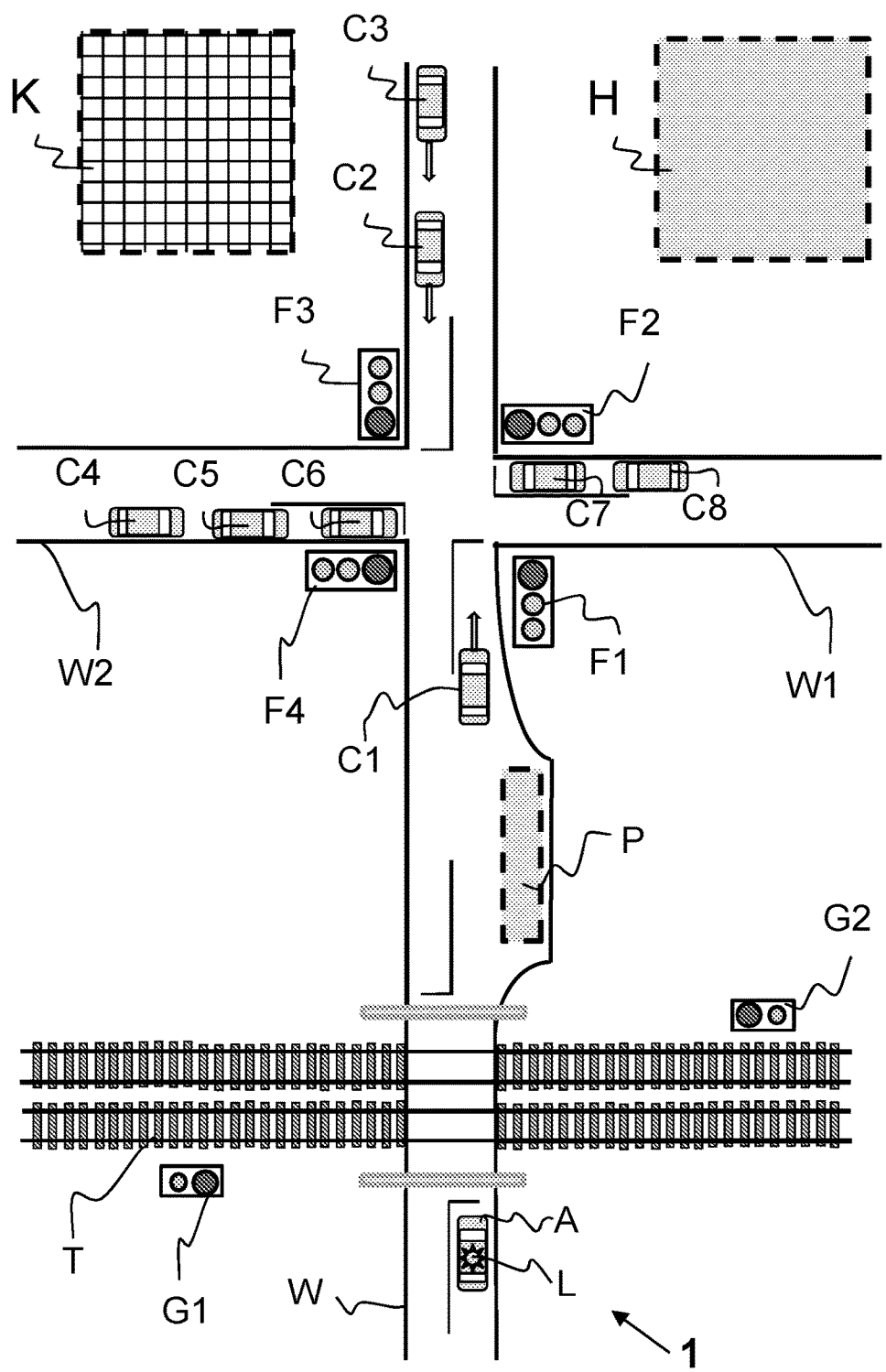

(51) Int. Cl.
*B60R 21/013* (2006.01)
*G01W 1/02* (2006.01)

(56) References Cited

U.S. PATENT DOCUMENTS

| | | | |
|---|---|---|---|
| 2010/0217096 A1* | 8/2010 | Nanikashvili | A61B 5/02438 600/301 |
| 2013/0219294 A1* | 8/2013 | Goldman-Shenhar | G06F 3/0484 715/751 |
| 2013/0221647 A1* | 8/2013 | Ivenz | B60R 21/36 280/770 |
| 2014/0058583 A1* | 2/2014 | Kesavan | B62D 41/00 701/1 |
| 2014/0341467 A1* | 11/2014 | Seo | G06T 5/008 382/167 |
| 2015/0105999 A1* | 4/2015 | Sangameswaran | F02N 11/0837 701/112 |
| 2016/0152180 A1* | 6/2016 | Kirsch | B60Q 9/00 701/36 |

* cited by examiner

INTELLIGENT SAFETY SYSTEM FOR VEHICLES

The present system regards a smart safety and emergency-assistance system for vehicles of any kind.

In particular, the present invention constitutes an improvement and extension of the patent application No. BA 2014 A000010 filed in the name of the present applicant on Feb. 17, 2014.

There currently exist in the prior art numerous patents filed in the field of smart systems applied to motor vehicles.

In particular, the following patents are known: the U.S. patent No. US 2013/219294 A1 (published on Aug. 22, 2013), the international patent No. WO 01/64481 A2 (published on Sep. 7, 2001), the German patent No. DE 10 2005 033404 A1 (published on Jan. 25, 2007), the international patent No. WO 2014/085302 A1 (published on Jun. 5, 2014), the international patent No. WO 2013/155661 A1 (published on Oct. 24, 2013), the German patent No. DE 10 2012/002037 A1 (published on Aug. 8, 2013), the European patent No. EP2620929 (published at an international level also as WO 2012/087635 on Jul. 28, 2012), the international patent No. WO2014156501 (published on Oct. 2, 2014), the Chinese patent No. CN203535809 (published on Sep. 23, 2013), as likewise the U.S. patent No. US 2005 156457 A1 (published on Jul. 21, 2005), and the international patent No. WO 99 25581 A1 (published on May 27, 1999).

The patents Nos. US 2013/219294 A1, WO 01/64481 A2, DE 10 2005 033404 A1, WO 2014/085302 A1, WO 2013/155661 A1, and DE 10 2012/002037 A1, albeit regarding systems for remote control and monitoring of a vehicle, do not ensure detection of the data in the case of malfunctioning of the sensors themselves or of the electronic control unit, nor do they enable interaction with other monitoring systems external to the vehicle itself (for example, public and private surveillance video cameras) nor above all with the motor vehicle in a passive state.

The international patent No. WO 01/64481 A2 does not ensure detection of the data in the case of malfunctioning of the video cameras themselves or enable interaction with other monitoring systems external to the vehicle itself (for example, public and private surveillance video cameras) provided with mirrors with video cameras, whether the motor vehicle is in a passive state or an active state.

The patent No. EP2620929 or, equivalently, the patent No. WO 2012/087635, the international patent No. WO2014156501, and the Chinese patent No. CN203535809 regard smart systems that can be applied to vehicles of any kind that are equipped with various devices, such as optical sensing means, sensors, means for detecting road traffic at a distance, means for automatic driving of the vehicle, a driver-assistance system capable of automatic identification of traffic lights.

The first three patents of the prior art basically have in common the following disadvantages:
  the European patent No. EP2620929, and equivalently the international patent No. WO 2012/087635, present the disadvantage of regarding a safety system relevant exclusively to public emergency means, when these get caught up in the road traffic, in order to facilitate use by them of the emergency lanes, giving timely warning of their presence to the other motor vehicles;
  the international patent No. WO2014156501 regards a system for automatic driving of articulated lorries or means of transport of any kind that are equipped with a trailer when they have to carry out particular maneuvers in reverse or during normal driving in particular or well-defined areas and presents the disadvantage of not alerting those who are not present in the range of manoeuvre of the vehicle driven automatically and of not enabling fast automatic assistance to the vehicle;
  the Chinese patent No. CN203535809, albeit provided with a tele-sensing system for detection of the state of activation of traffic lights in conditions that would otherwise not be detectable by the driver, does not enable automatic remote emergency assistance for the latter.

The patent No. US 2005 156457 A1 and the international patent No. WO 99 25581 A1 regard systems, methods, and apparatuses for controlling a component, system, or subsystem of a motor vehicle and are based in particular upon monitoring occupation of the seats of the motor vehicle via ECG sensors, weight sensors, infrared sensors, etc. The latter two patents of the prior art present further disadvantages; in particular, these known systems:
  do not enable activation of the sensors when the vehicle is stationary with instrument panel off and/or without the key;
  do not enable activation of the emergency system in the case of driver/passenger present but unwell when the vehicle is stationary with the engine off and without the key, or with the key inserted and the instrument panel off;
  do not enable detection a posteriori of whether activation of the airbag (with motor vehicle parked) has been effectively caused by a real accident or whether the latter has been simulated with some artifice, for example in order to defraud the insurance company;
  are not equipped with any means for digital filing of the data recorded that is active also with the vehicle stationary with instrument panel off and/or without the key;
  do not enable activation of the devices provided on the motor vehicle (air-conditioning systems, power windows, radio, etc.) when the vehicle is stationary with instrument panel off and/or without the key, said devices being useful especially when passengers who wish to use them are present on board the vehicle;
  do not enable, in the event of impact, when the vehicle is stationary with instrument panel off and/or without the key, but with passengers on board, selective activation of the airbags of the respective occupants of the vehicle, through the various devices, sensors, and means for automatic management thereof.

A fundamental object of the present invention is to overcome simultaneously all the aforesaid disadvantages presented by the prior art.

The present smart safety and emergency-assistance system for motor vehicles of any kind is completely innovative in so far as so far there do not exist similar systems.

The present system is likewise inventive in so far as it has initially been devised in order both, in general, to overcome the aforesaid problems and disadvantages of the prior art and, in particular, to overcome, in the case of the vehicle in passive conditions, the problem linked to a state of immediate and serious distress of the driver or of any possible passengers present in the vehicle, in order to render as fast as possible their emergency assistance, alerting instantaneously and in an automatic way the emergency services, the safety services, the fire brigade, etc., extending the alarm both to the mobile facilities and to the fixed facilities closest to the place where prompt intervention is required.

Another purpose of the present system is to overcome the aforesaid problems of the prior art by providing prompt and immediate assistance to the driver of the vehicle and to the persons present therein, even when, for reasons of a meteorological nature (fog, rain, sandstorm, etc.), it is impossible to drive the vehicle by sight, and it is only possible to drive it in a completely automatic way. With the present system it is, instead, possible to drive the vehicle automatically as far as the closest emergency lay-by or service station.

Another purpose of the present invention is to set in direct communication the vehicles, equipped with the present system, present in the vicinity of the vehicle that is in difficulty (from a radius of approximately 200 meters, up to far greater distances in the case of satellite connection) so as to drive the vehicles themselves automatically in order to prevent any possible accidents.

A further purpose of the present system is that it is operative also in the case where accidents between vehicles, whether or not equipped with the present system 1, were to occur, provided that at least one of the occupants is wearing a device purposely designed for detecting the biometric data. The nearby vehicles equipped with the system 1, also with the aid of possible public video cameras N, will provide a better overview of the dynamics of the accident that has occurred.

Another purpose, certainly no less important than the previous ones, is to set in direct communication, in the case of emergency, the vehicle equipped with the present system with bodies for traffic management and control, in order to be able to exert remote control of traffic lights, railway or tramway level crossings, ambulances, hospitals, public means of transport, police and emergency means, etc., in order to minimize the period in which the vehicle is travelling in a state of emergency.

A further purpose of the present invention is to record, via the present system (in an automatic way), the modalities and data regarding possible vehicles that bump into one another in a non-serious way, so that they are not forced to stop on the road and hence prevent further hazards, thus optimising safety.

To the above fixed and mobile emergency facilities there will automatically be communicated all the sensitive data pre-recorded and detected by the sensors or by other detection means, together with the data regarding the urgent intervention required, including possible known pathological conditions of the occupants the vehicle themselves (allergies, intolerance, therapies in progress, medicines recently assumed, blood group, religious faith, possible presence among them of donors of organs, etc.), in order to render any intervention as effective and efficient as possible.

On the other hand, the presence of the black box and the possibility of the system to transmit and hence communicate the data recorded to others (public and private video cameras installed in the vicinity of the place where the vehicle is located, provided that they are equipped with intercommunication means recognised by the system and vice versa) enables the invention to be completely innovative as regards reliability of a posteriori description of the event that has occurred (a road accident, a case where the driver or passengers suddenly feels/feel faint or unwell, etc.). This further possibility of the present system also enables the other vehicles, provided that they are equipped with similar systems, likewise using fixed and mobile facilities for public or private safety that are designed to monitor events, to activate their own sensors and devices for receiving information, from other monitoring angles, on what is happening in the vicinity. For instance, in the case where, following upon an accident, also the system according to the present disclosure, installed on the vehicle, were to break down, such further external recording means (e.g., public and private video cameras, other systems similar to the one installed on the vehicle, etc.) will function as monitoring means alternative to the system and will be useful the police force and similar forces for gathering information a posteriori.

The above purposes are achieved by providing a system 1 according to what is specified in the annexed claims and described hereinafter.

Figure 2:
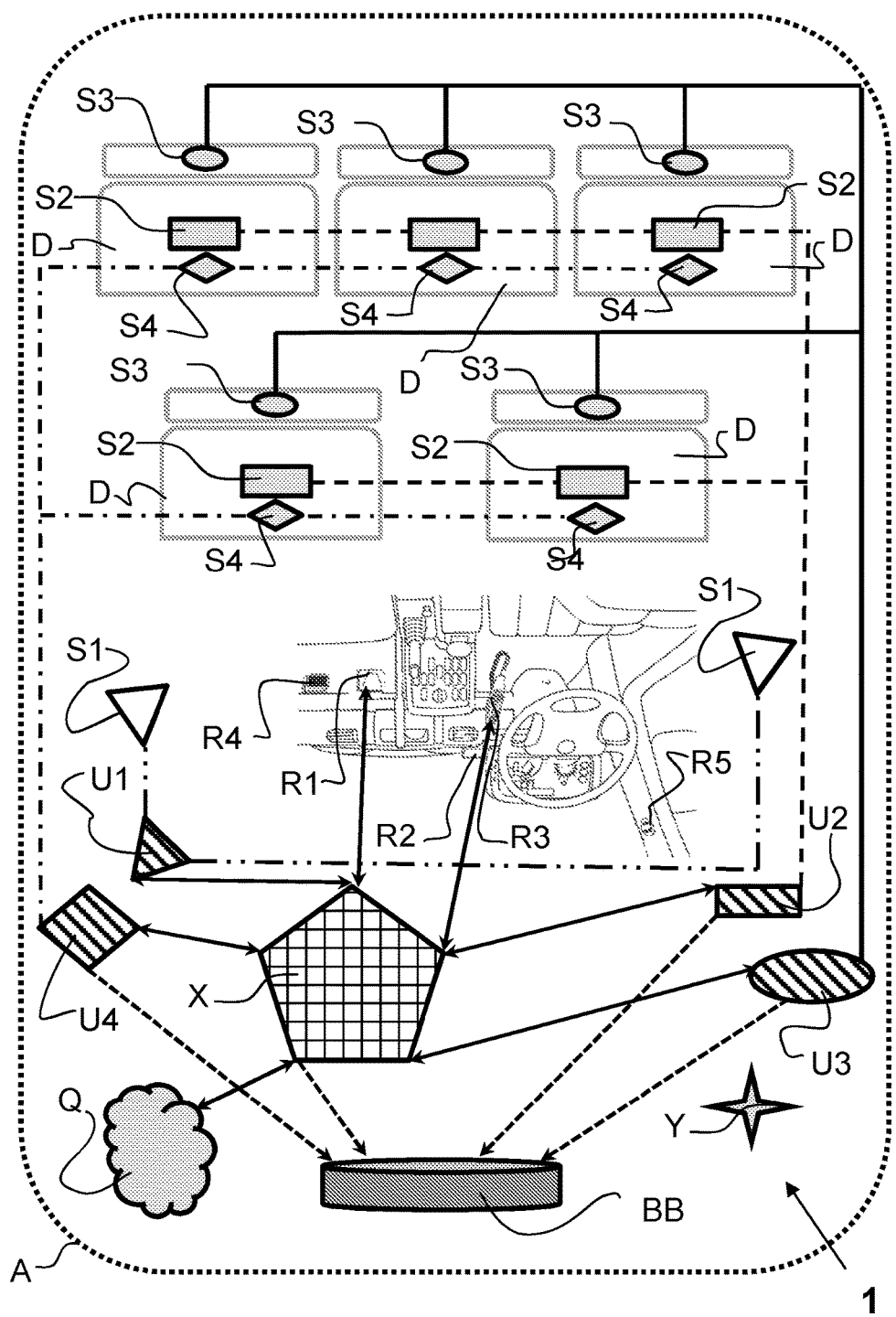
Figure 3:
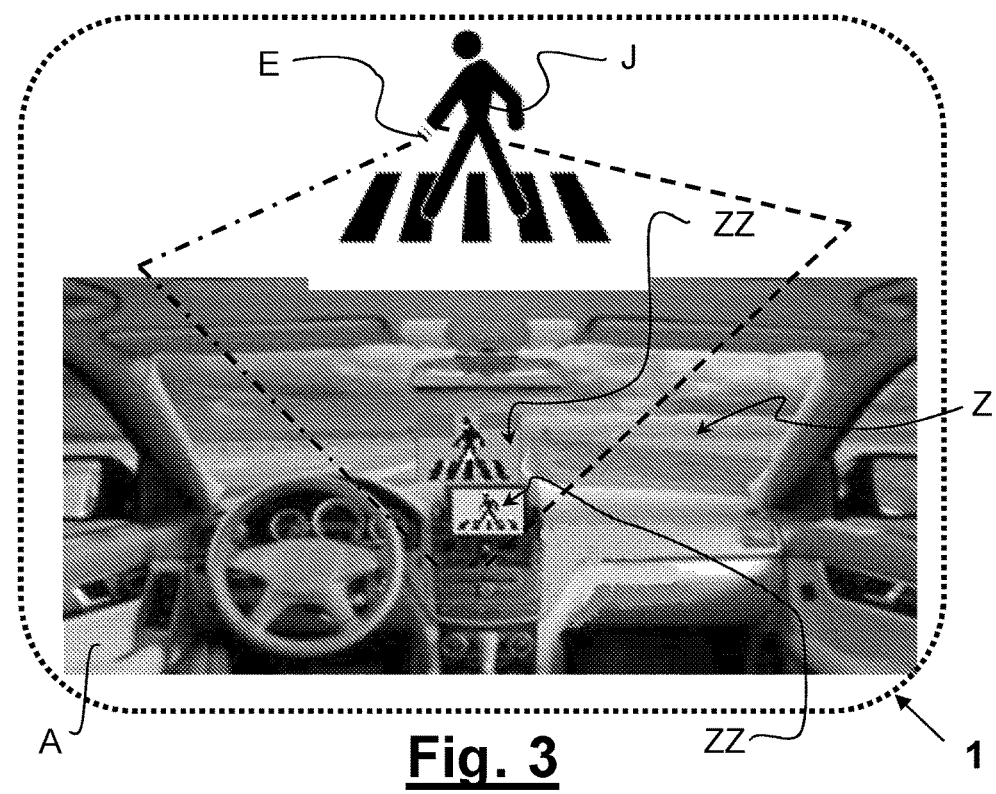
Figure 4:
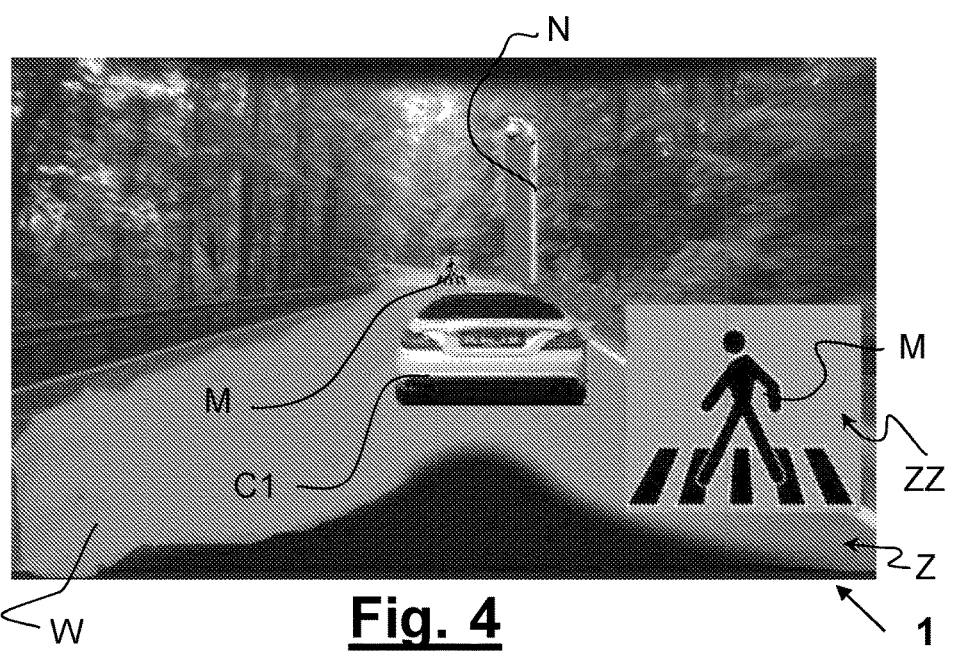

A better understanding of the present invention will be obtained from the ensuing detailed description of a preferred embodiment, provided by way of non-limiting example, with reference to the attached drawings, wherein:

FIG. 1 is a graphic diagram of the system 1 applied to a vehicle A, from which there emerges the mode of operation of the system 1, when the vehicle A finds itself in an emergency situation in road traffic;

FIG. 2 is another graphic diagram of the system 1, installed inside the passenger compartment of the vehicle A, where there may be noted some basic elements of the system 1, such as: a radio/telecommunication means R1, a black box BB for recording data also in the case of an emergency, a plurality of sensors (represented, merely by way of example, are ECG sensors S3, weight sensors S2, infrared sensors S1, baby-car-seat sensors S4, and ultrasound sensors), as well as means X designed for automatic driving and management of the vehicle A itself;

FIG. 3 is a schematic view from inside the vehicle A (in this case a motor vehicle), representing an application provided by way of non-limiting example of the system 1 according to the present invention, where it may be noted how it is possible to detect in due time the presence of a pedestrian J (or cyclist or animal, etc.) provided with a bracelet E, that would otherwise not be visible to the driver of the vehicle A (for example, in the case of a bend with poor visibility, in conditions of fog, sandstorm, etc.), via external video cameras; the image ZZ of the pedestrian J is displayed on the windscreen Z of the vehicle A or on a monitor present inside the vehicle A in order to prevent in due time any possible accident;

FIG. 4 is a schematic view from inside the helmet of a motorcyclist that is riding a motorcycle A, which shows an application (once again provided by way of non-limiting example) of the system 1 according to the present invention, where it may be noted how it is possible to detect in due time the presence of a pedestrian M (or animal or cyclist, etc.) not provided with bracelet, that would otherwise not be visible to the person riding the motorcycle A (for example, in the case of a bend with poor visibility, in conditions of fog, sandstorm, etc.), via external video cameras N; the image ZZ of the pedestrian M (or cyclist or animal or vehicle, etc. without bracelet or without system 1) is displayed on the visor Z of the helmet or on the windshield or monitor of the motorcycle A in order to prevent any possible accident in due time.

As may be evinced from the above attached figures, the present invention regards a smart system 1 of safety and emergency assistance for vehicles A of any kind (motor vehicles, motorcycles, articulated lorries, trains, ships, aeroplanes, etc.), basically comprising means for automatic GSM/GPRS/UMTS radio/tele-communication for transmission of the alarm R1, a black box BB, a plurality of sensors S1, S2, S3, S4, amongst which ECG sensors S3, weight sensors S2, infrared sensors S1, sensors for the baby car seat S4, ultrasound sensors, as well as means X for automatic driving and management of the vehicle A via as many means U1, U2, U3, U4 for interfacing said sensors S1, S2, S3, S4.

The system 1 is characterized in that it able to activate remotely, via said means X for automatic driving and management of the vehicle A, instantaneous communication of the state of emergency of the vehicle A even in passive conditions when the vehicle is stationary with the engine off and without the key inserted into the ignition, or with the key inserted and the instrument panel off, in the case where the driver/passenger/animal present on board the vehicle A is in distress, such as in the case of a heart attack, recording in a black box BB, at pre-set time intervals, the data regarding the event. The system 1, through a vehicle micro-telephone R3 and said automatic communication means R1, communicates the data recorded also on the cellphone of the owner of the vehicle A, to the relatives/friends and/or to the digital archives of the emergency-service providers and authorities.

The system 1 is also provided with at least one collar/bracelet E equipped with at least one of said plurality of sensors S1, S2, S3, S4, said collar/bracelet being worn by the driver/passenger/animal and being connected to the vehicle in Wi-Fi mode and activating an alarm signal R1 for fast emergency intervention on behalf of the driver/passenger/animal, in the event an accident or someone being unwell.

The present system 1 enables, through its various constitutive elements, such as for example the ECG sensors S3, weight sensors S2, infrared sensors S1, baby-car-seat sensors S4, automatic activation or activation controlled autonomously by the occupants of the vehicle A of the devices present on board the vehicle itself, such as airbags, power windows, radio, the air-conditioning system, etc., when the vehicle A is stationary, namely in passive conditions of the vehicle A (with or without the key inserted in the ignition and the instrument panel off), with or without the driver or possible passengers on board.

The system 1 thus constituted, as emerges from FIG. 1, is such as to enable assistance, in the case of need, not only of the driver but also of the passengers (or animals), when one of the latter were to be in sudden serious distress (heart attack, respiratory block, etc.).

The system 1 can be applied on all vehicles: lorries, buses, automobiles, motorcycles, etc., together with further light-alarm means L and acoustic-alarm means.

The system 1 is equipped with devices R1, R2, R3, R4, R5, sensors S1, S2, S3, S4, and interface, management, and communication means U1, U2, U3, U4, X such as to detect the closest emergency centre H, and to previously alert the staff of arrival of the individual requiring treatment, alerting any vehicles (which in FIG. 1 are designated by C1, C2, C3, C4, C5, C6, C7, C8) equipped with the system 1 that may be present on the same road W with the aim of freeing a lane so as to assign it the function of emergency lane (where such a lane is not present), as well as alerting the system for remote management of cross-roads (in FIG. 1 the road W intersecting the railway T or the road W intersecting the roads W1 and W2), possibly regulated by traffic-light systems (the lights G1 and G2 for the railway T, and the traffic lights F1-F3 for the road W1 and F2-F4 for the road W2), bodies for controlling road traffic (police, etc.), public means of transport (trams, trains, etc.), private means radio-connected to the system 1 via the GSM radio unit R1 of the vehicle A (which is likewise equipped with a display R2, a micro-telephone R3, a speaker R4, and a microphone R5) or via other devices of a known or less known type, or again also through purposely provided light/acoustic alarm means L for warning also vehicles not equipped with said smart system 1 of said state of emergency.

The system 1 will also interface with the vehicles not equipped with the same system, provided that the drivers of these vehicles are equipped with the bracelet E, which, interfacing with their own new-generation mobile phone (for example smartphone), will warn them of the imminent danger, via a voice message or other alarm signal reproduced by the devices present on board the vehicle itself.

Following upon activation of the alarm signal in the vehicle provided with the system 1, in the case where the driver/passenger/animal is unwell, the same system 1 will render the passenger compartment of the vehicle as comfortable as possible for the individual requiring assistance in a selective and automatic way, likewise enabling also autonomous regulation of the other devices for the further possible occupants of the vehicle A.

The aforesaid electronic bracelet/collar E, mentioned previously, comprises one or more of the following sensors and/or devices: ECG sensors, oxygen-level sensors, body-temperature sensors for detecting the temperature also as a function the ambient temperature of the vehicle or the external temperature, blood-pressure sensors, accelerometers, gyroscopes, altimeters, stress sensors, sensors for detecting the assumption of drugs/alcoholic beverages, sensors for detecting biometric data, photovoltaic mini-cells, tags interfaced with said alarm means R1, Bluetooth and/or Wi-Fi interface, automatic keys for opening/closing/starting the vehicle A, mini-memory or black box for recording data.

The bracelet E can be configured in such a way as to enable starting of a number of vehicles at the disposal of the owner, in order to prevent him having to carry a large number of keys, likewise avoiding the need for the cellphone in the case where it has been forgotten or is inoperative.

The data detected by the bracelet E are monitored constantly over time starting from when the bracelet is donned. In the case of animals, the bracelet may be replaced with a collar.

The monitoring performed by the bracelet E, whether simultaneously or not with the monitoring performed by the system on board the vehicle is instantaneously transmitted to the safety services, thus allowing the possibility of preventing in due time any possible pathological conditions that might cause damage to the driver himself (for example, onset of a heart attack or of a stroke), to the passengers, to third parties external to the vehicle (pedestrians or animals wearing the bracelet or collar), likewise enabling automatic management of the vehicle itself, in the case where the sensors on board the vehicle and/or the bracelet/collar detect the state of unconsciousness of the driver.

The bracelet/collar E monitors, whether simultaneously or not with the control made by the system 1 on board the vehicle, vital data of the driver and/or of the passengers/animals present on board the vehicle A on which the system 1 is installed and/or of persons/animals external to the vehicle itself, instantaneously transmitting an alarm message to the safety services so as to prevent in due time any possible pathological conditions that might cause damage to the driver himself, to the passengers/animals, or to third parties external to the vehicle, likewise enabling automatic management of the vehicle itself A, in the case where the sensors on board the vehicle and/or the bracelet/collar E detect the state of unconsciousness of the driver, moreover optimising the environmental parameters Q of the passenger compartment of the vehicle A also for all the other possible passengers present.

The above bracelet/collar E enables detection and monitoring of possible malfunctioning of the system 1 or of specific component elements, in order to make up for their malfunctioning and be activated in their stead to guarantee operation of the devices controlled thereby, which are present on board the vehicle A or can be inserted, for example, in a helmet, in the case of a motorcycle.

The bracelet E not only enables detection of the data in the case where there occurs a malfunctioning of the system 1 and/or of the various sensors, but also enables, in the event of two or more vehicles not equipped with said system 1 (provided that the drivers are each wearing a bracelet E that is interfaced with the respective cellphones), communication, not only with the system 1 and the public and private video cameras N, but also with the other bracelets. For instance, in the event of a vehicle not equipped with the system 1 that is arriving in the opposite direction on the wrong side of the road, this vehicle, as well as the other vehicles travelling in the right direction (which are not equipped with the system 1 either, provided that the drivers are wearing a bracelet E) will immediately be warned of the imminent danger via said voice message.

The above bracelet or collar connected directly to persons and animals thus makes it possible to make up in an effective and efficient way for any faults or breakdowns that might happen to the system applied to the vehicle, and vice versa.

In particular, as regards motorcycles, the bracelet can assist the sensors and the system on board the vehicles, together with the helmets that use said detection technologies for safety of the motorcyclist and pillions. More precisely, the present system 1, together with the bracelet, has a valid substitutive and/or integrative function in regard to the helmet provided with said new technologies (ECG, video cameras, temperature sensors, accelerometer, gyroscope, etc.).

Said system is characterized in that it has been devised not only for the safety of those who are on board the vehicles, but also for pedestrians and animals that are not on board the vehicles.

The system 1 also enables monitoring, by recording, of sudden and undesirable events (such as accidents, impact, damage, effraction, theft, meteorological events, etc.), storing the recordings in the black box BB starting from at least one minute prior to occurrence of the event (moreover with the possibility of detecting the presence in the vicinity of the vehicle of any object/means/individual) and remaining on in recording mode both before and after the event so as to constitute (both in the passive state and in the active state of the vehicle) a valid deterrent for ill-intentioned people and constitute, in judicial proceedings, a valid proof for reconstruction of the dynamics of the event.

Said system 1 is able in fact to activate remotely instantaneous communication of the state of emergency of the vehicle A in passive conditions, in the case of absence of drivers/passengers on board the vehicle A and in the case where the vehicle A is involved in events such as impact, attempts at breaking in or stealing, removal via tow truck, acts of vandalism or meteorological events, likewise managing in a completely automatic way, also remotely, driving of the vehicle itself and automation of the devices present therein, in order to drive it automatically and safely as far as lay-bys or parking areas P.

In addition, said system 1, in the case of extraordinary meteorological events, such as thick fog, a sandstorm, and in all those cases where it is impossible to continue to drive the vehicle A by sight, is able to automate driving of the vehicle A, driving it safely to the closest lay-by or parking areas P, as is shown in FIG. 1. The system 1 also enables the driver of the motor vehicle to monitor the traffic conditions even to a distance of hundreds of meters (or kilometers) by interfacing with said video cameras N (FIG. 4). For instance, the system 1 is useful in the case where a landslide at a distance from the vehicle A occurs, perhaps after a bend with zero visibility.

The above system 1, both when the vehicle is moving and when it is stationary with the engine off with or without the key, will activate the airbags present therein in a selective way, not only in the case of an accident, but also in the case of a calamitous/wilful/unforeseen event for which the sensors record sudden damage to the outer body or glazed surfaces of the vehicle itself, for instance, in the case where heavy objects are thrown by vandals at the vehicle A, or again a heavy object reaches the vehicle in an unexpected way for various accidental reasons, such as wind, an explosion, etc. (in this connection, we may recall fatal accident due to detachment of a piece of metal from a bus, which reached a vehicle that was coming in the opposite direction).

When the vehicle A that is travelling is of high value or is in a situation of emergency/danger, in the case where the smart system 1 detects any impact with other vehicles, it allows the driver not to stop the vehicle A, so as to guarantee safety of the driver himself and that of the passengers from attempts at theft/robbery or so as to prevent further accidents and hindrance to circulation (consider the case of an accident that occurs on a narrow and winding road or in the presence of particular meteorological events, such as snowstorms, hailstorms, etc.), likewise enabling, immediately after, automatic driving of the vehicle to the closest emergency lay-by P or service station (FIG. 1). Identification of the characteristics of the event that has just occurred is obtained not only via customary on-board video cameras that enable automatic recording of the data (number plate, identification of the driver) of the other vehicles involved in an accident, but also, possibly, through unique identification codes with which each vehicle will be equipped, such as for example the tags Y (FIG. 2), which enable automatic detection of the vehicles themselves. The system 1 provided with said unique identification codes Y thus enables easy identification of the vehicle A and of its driver, both when the vehicle A is stationary and when it is moving.

Moreover, the system 1 may activate other video-monitoring systems, such as public or private video cameras N provided with the possibility of communication via Bluetooth or Wi-Fi connection (or via mobile phone), thus providing further angles of view of an accident that has occurred (FIGS. 3 and 4).

The data detected by the system 1 and stored in the black box BB will be instantaneously tele-transmitted to remote archive/archives in such a way as to make them available even in the case of theft of the vehicle A or possible irreversible damage to the black box BB itself, the data being simultaneously recorded also on the bracelet/collar E.

The above system 1 enables, also in the case where there is total failure of the sensors S1, S2, S3, S4, detection of imminent hazards that cannot be seen by the driver on account of the position occupied in that contingency by the vehicle A (for example, as in the case already mentioned previously of a landslide just after a bend), using, as alternative sensors, the public or private video cameras N present in the vicinity of the vehicle A itself or means for automatic tele-transmission of the alarm signal R1, purposely activated by means of said alternative sensors.

The system 1, through the vehicle micro-telephone R3 and the GSM radio unit R1 may communicate the data recorded also to the cellphone of the owner of the vehicle A, and/or to the digital archives of the authorities. Said communication is, for example, useful also in the case where the vehicle A is removed by a tow truck. In this way, the owner would be in any case instantaneously alerted of the new position assumed by the vehicle A so that he can reach in a timely way his own vehicle A when it is being towed away or he can easily reach the parking area K of the tow truck in order to recover his vehicle. The data recorded in the case of an accident are instantaneously communicated to the authorities, which in this way may have a valid means of aid for their investigations.

The smart system 1 also comprises a plurality of ultrasound sensors and/or other equivalent means that can be installed on the fixed/mobile outer surfaces of the vehicle A, which are designed to detect any immediate danger and prevent it from happening. For instance, in the case where a door of the vehicle A is suddenly opened, without realising the presence of the immediate danger constituted by another vehicle that is passing alongside (whether it is equipped or not with the system 1, provided that, in the latter case, the driver is wearing the bracelet E interfaced with his own cellphone), the system 1 will in any case issue a warning alarm, and, in this case, will also prevent opening of the door by means of an electromagnetic or mechanical device. Said detection is made with the aid of ultrasound sensors and the like that can be installed on the perimetral surface of the vehicle A, in the case in point, at the end part of the doors, in order to prevent damage both to the other vehicles and to the door itself.

The system 1 makes it possible to provide personal messages on the screen present in front of the driver Z and of the passengers, in strictly confidential mode, and not only via the sensors present in the vehicle A, but also via the other devices and the internal video cameras designed to detect the biometric data of each individual present in the vehicle A (FIGS. 3 and 4). Transmission of the messages is obtained not only via the various weight sensors, infrared sensors, etc., present in the vehicle A and provided for activation of the airbags, but also through the internal video cameras that detect the biometric data stored on the mobile phone. Moreover, in the event of malfunctioning of said sensors, through the tag of the bracelet E connected to the respective cellphone, failure will be made up for in an effective way. In the case of failure also of the cellphone, the micro-memory of the bracelet can be used, in which the same data can be moreover stored and can be further transmitted to the vehicle telephone and thus be visible in a selective way on the screen.

In the case where a vehicle A provided with the present system 1 overtakes another vehicle, such as a long vehicle or a large van Ci, which is also equipped with the same system 1, both of the systems 1 communicate to one another the data regarding the overtaking manoeuvre in progress, enabling the driver of the vehicle A who is carrying out the manoeuvre, also to monitor the situation that is developing in front of the vehicle Ci that is preceding the vehicle A, directly on the monitor Z of the dashboard or windscreen of the vehicle A, in the case where this is a motor vehicle, or else, in the case where it is a motorcycle, on the monitor of the motorcyclist's helmet or on some other display present on the dashboard or windshield (FIGS. 3 and 4).

In the case where the system 1 is installed on articulated lorries or vehicle with trailers, it enables automatic safe uncoupling of the trailer and parking P thereof, rendering faster emergency assistance to the driver in the case where he suddenly feels faint or unwell. To enable automatic uncoupling and safe parking of the trailer, there is envisaged the use of purposely provided devices for uncoupling and electric driving of the trailer itself.

In the case where a driver/passenger of the vehicle A feels unwell, the system 1 will make it possible to render the passenger compartment as comfortable as possible for him, regulating, for example, the inclination of the backrest of the seat D and the other characteristics thereof in a selective way, likewise optimising the environmental parameters Q of the passenger compartment of the vehicle A also for any other passengers who may be present.

The system 1 is able to alert emergency assistance services and, by moreover activating purposely provided emergency lights L, to alert other vehicles not equipped with radio/radar alarm system of the possible accident that has occurred, whether the vehicle provided with the system 1 is in the passive state (an automobile stationary with or without the key) or in the active state (an automobile travelling or with the engine off with driver who operates the emergency lights as visual alarm).

The system 1 detects also possible faults that may have occurred to the vehicle A in a passive state, communicating in real time, via the vehicle micro-telephone R3, the state of the vehicle that requires maintenance (puncture of the tyres, leakage of lubricant or fuel, etc.). The system 1, provided with vehicle telephone and video camera, can be installed also on all kinds of motorcycles, in order to monitor the state of the motorcyclist via a bracelet E equipped with sensors, as already specified. In the event of accident, for example, the bracelet, connected to the motorcycle like an umbilical cord, via the sensors, will issue an alarm radio signal R1 for emergency assistance to the motorcyclist.

In particular, from FIGS. 1 and 2, there may be readily appreciated, even by a person who is not skilled in the field, the simplicity of construction of the system 1, which functions both with the vehicle in active conditions (a technique already known, but applied, according to the present invention, with innovative modalities not yet known) and with the vehicle in passive conditions (a technique not known and applied with totally innovative modalities).

A further feature of the present invention may be appreciated by considering the following example. We shall consider the case of a vehicle provided with the present system overtaking another vehicle such as an articulated lorry or a large van, which is also equipped with the same system. The systems, which communicate automatically with one another, will enable the driver of the vehicle who intends to carry out the overtaking manoeuvre to monitor—remaining on board his own vehicle—the situation that is developing in front of the vehicle in front of him. Automatic communication is obtained either following upon activation of the direction indicator before the overtaking manoeuvre is started or by other means and procedures. Activation of the direction indicator also enables the vehicle in front to be alerted automatically to warn its driver of what is happening and monitor what is developing in front of this vehicle. This may, for example, be obtained by reproducing the scene framed (FIGS. 3 and 4) on the monitor of the dashboard or windscreen, in the case of a motor vehicle, or else, in the case of a motorcycle, on the monitor of the motorcyclist's helmet or on some other display present on the dashboard or windshield.

In the case where, instead, the vehicle in front, in the direction of travel, is not equipped with a system such as the one described so far, the system 1 on board the vehicle that wishes to overtake is able to interface with public and/or private video cameras in order to render safer driving of the vehicle itself (for example, warning the driver of the presence of a bend or forewarning him of a possible danger not visible from the position in which the vehicle is located, such as a child or an animal that is crossing over the carriageway not visible to the driver, or in the case of fog or other phenomena that prevent a clear view of the carriageway).

The public video cameras N must enable interfacing with the system 1 and possibly guarantee a wide angle of vision.

There may also be provided ultrasound sensors or the like to enable optimal detection of pedestrians, cyclists, animals, vehicles, etc. M not equipped with the bracelet E or system 1.

A further advantage is represented by the fact that it is possible to communicate to the pedestrian who is equipped with the bracelet and cellphone of the presence of a dangerous animal (for example, a bear), provided that the latter has a collar for its satellite location.

The present system 1 can be applied to all known types of vehicles, including aeroplanes, ships, trains, etc. For instance, in the case of the accident that occurred to the cruise liner "Costa Concordia", if all the passengers had been equipped with the bracelet E according to the present system 1 very probably there would have been a more timely rescue intervention, or at least the persons lost at sea, whether alive or dead, would have been identified more easily by the rescue operators.

Another example that explains very clearly the importance of the present system 1 is what happened to a little girl who was struck by the propeller of a motorboat driven by her father or else again the frequent accidents where children are run over by a vehicle that is performing a reverse manoeuvre or similar manoeuvre. The present system 1, in these cases, with the aid of the bracelets E, would prevent this kind of accidents from happening.

In the light of the foregoing, the importance of the present invention may be readily understood, which is hence new and inventive, in so far as it solves simultaneously all the aforementioned problems of the prior art and, moreover, solves the problem linked to a sudden and serious state of ill health of the driver or of passengers or animals that may present on a vehicle, even with the vehicle stationary without the key inserted in the ignition (passive conditions), in order to render as fast as possible emergency assistance, and moreover solves the problem of providing a prompt intervention of assistance to the driver of the vehicle and to the persons present on the vehicle, even when, for reasons of a meteorological nature (fog, rain, etc.), it is impossible to drive the vehicle (vehicle in active conditions) by sight, and a completely automatic drive is necessary.

The advantages of the present invention are innumerable and are summed up briefly hereinafter:

possibility of setting in direct communication the vehicles present in the vicinity of the vehicle A, in the case where they are equipped with the present system (from a range of a few hundreds of meters to several kilometers) so as to handle automatic driving of the vehicle itself in order to prevent possible accidents;

possibility of setting in direct communication, in the event of emergency, the vehicle A equipped with the present system with bodies for management and control of the traffic, in order to be able to exert remote control of traffic lights, railway or tramway level crossings, ambulances, hospitals, public means of transport, police and emergency means, etc., so as to minimize the times required for emergency intervention on the vehicle;

possibility of not requiring the vehicles that have been involved in an accident in a non-serious way to stop along the road, so as to prevent, safely, further hazards;

possibility of optimising the state of emergency lanes, instantaneously warning of the presence of the emergency situation the other motor vehicles, whether they are or not equipped with the system 1, provided that in the latter case the driver is wearing the bracelet E interfaced with his cellphone;

possibility of alerting those who that not are present within the range of manoeuvre of the vehicle driven automatically, remotely alerting the vehicles involved in the manoeuvre of the hazards and also of the possible need for fast emergency intervention on behalf of the driver;

possibility of enabling automatic tele-assistance of the driver and of the passengers of the vehicle A;

possibility of enabling activation of the sensors present in the vehicle A, even when the vehicle is stationary with instrument panel off and/or without the key;

possibility of detecting a posteriori whether activation of the airbag (with the motor vehicle stationary) has been effectively caused by a real accident or if the latter has been simulated with some artifice, for example in order to defraud the insurance company;

possibility of equipping the vehicles A with a means for digital filing of the data recorded, which is active also when the vehicle is stationary with the instrument panel off and/or without the key;

possibility of enabling activation of the devices provided on the motor vehicle (air-conditioning systems, power windows, radio, etc.) when the vehicle is stationary with instrument panel off and/or without the key;

possibility, in the event of fog and sandstorm (and in all the cases of poor visibility), of managing automatic driving of the vehicle, with remote communication of what is happening;

possibility of deactivating/activating one's own location at one's own discretion;

possibility of selective activation of the airbags both in the case of an accident on the vehicle while it is moving or while it is stationary (with the engine off with or without keys) and in the case of a wilful, calamitous, or unforeseen event;

possibility of communicating to other vehicles of the imminent danger constituted by sudden opening of a door of the vehicle, it being likewise possible to block the door.

Another advantage of the present system is represented by the fact that it envisages a bracelet or collar that can be worn by any occupant of the vehicle, but also by pedestrians or animals not necessarily on board the vehicle itself. This advantage is evident in the case, for example, where a pedestrian provided with said bracelet is hit. What has been said previously, may be applied also to the case of pedestrians and animals that are not necessarily on board vehicles.

Yet a further advantage deriving from the possibility of application of just the bracelet also to passengers and drivers of vehicles that are not equipped with the system according to the present invention or that have the system is inoperative (as a result of problems of various nature) lies in the fact that the bracelet has the possibility of communicating as passive detection means (tag) with other vehicles equipped with the system that are passing nearby or through mobile radio/telecommunication means (cellphones and the like).

The bracelet also affords the advantage of standing in for the system in the case of breakdown or malfunctioning thereof, in addition to enabling monitoring not only of the person wearing it, but also of possible data recorded via nearby cellphones.

Among the benefits of the present invention, there must not be neglected those that derive from the low costs of the elements that make up the present system, in particular the bracelet or collar, as likewise their simple installation on any type of vehicle and, in the case of the bracelet/collar, the ease of replacement.

A further advantage lies in the possibility of carrying out a comparison between the data detected by the various sensors and internal video cameras and the data recorded on the cellphone or on the micro-memory of the bracelet, in order to display images or messages in a selective way on the corresponding screens of the individual occupants the vehicle.

The system 1 can find also other applications that are not effectively limited to the vehicles A, but can be applied also to any place where the presence of people and/or animals can lead to problems for their state of health and/or safety, such as offices, hospitals, schools, supermarkets, beaches, entertainment areas, or working areas in general.

It is also evident that the embodiment previously described by way of illustrative and non-limiting example may undergo numerous modifications, adaptations, integrations, variations and substitutions of elements with other functionally equivalent ones, without thereby departing from the sphere of protection of the ensuing claims.

LEGEND 1 system according to the present patent application
A vehicle
BB black box
Ci vehicles other than A, where i=1, 2, . . . , 8
D seat
E bracelet/collar
Fi road traffic lights, where i=1, 2, . . . , 4
G railway or tramway traffic lights, where i=1, 2
H hospital or emergency centre
J pedestrian, cyclist, animal, etc., provided with bracelet or collar
K parking area for removal of vehicle with a tow truck
L emergency lights
M pedestrian, cyclist, animal, vehicle, etc. without bracelet or collar or not equipped with the system
N public or private video cameras present along the route traveled along by the vehicle A or on vehicles other than the vehicle A
P emergency lay-by or service station
Q parameters of internal environment of the vehicle
Ri automatic radio-tele-audio-video-communication devices, where i=1, 2, . . . , 4
Si ECG sensors, weight sensors, infrared sensors, etc., where i=1, 2, . . . , 4
T railway or tramway
Ui means for interfacing with the sensors Si, where i=1, 2, . . . , 4
W road traveled along by the vehicle A
Wi other roads, where i=1, 2
X means for automatic driving and management of the vehicle
Y tags
Z windscreen, helmet, or vehicle (viewed from inside by the driver or motorcyclist)
ZZ image reproduced by the video cameras N on the display of the windscreen Z or on the monitor of the vehicle

The invention claimed is:

1. A smart safety and emergency-assistance system for a vehicle comprising:
    means for automatic Global System for Mobile communications/General Packet Radio Services/Universal Mobile Telecommunications System (GSM/GPRS/UMTS) radio/tele-communication for enabling transmission of data and of an alarm;
    a data recording device;
    a first set of a plurality of sensors comprising an electrocardiogram sensor, weight sensors, infrared sensors, a sensor for a baby car seat of the vehicle, ultrasound sensors;
    means for automatic driving and management of the vehicle, said means for automatic driving and management interfacing with said plurality of sensors, wherein said vehicle and an occupant present on board the vehicle is monitored for an occurrence of one or more predetermined distress events via the plurality of sensors, wherein during an occurrence of the one or more predetermined distress events, said system instantaneously sends, via said means for automatic driving and management of the vehicle, a communication indicating a state of emergency for the occupant of the vehicle, said communication being sent while the occupant is driving the vehicle or in a passive condition in which the vehicle is stationary and in a non-powered state with or without an ignition key being inserted in an ignition lock of the vehicle, and records in the data recording device, at pre-set time intervals, data regarding the monitored distress event; and wherein a vehicle micro-telephone and GSM/GPRS/UMTS radio/tele-communication means transmit data recorded on the data recording device and via a cellphone of the occupant of the vehicle to at least one of designated emergency contacts stored in the occupant's cellphone, a remote digital archive and operating centers of emergency-service providers and authorities; and
    a bracelet including a bracelet data recording device and a second set of the plurality of sensors, said bracelet being worn by the occupant of the vehicle, said second set including a bracelet data recording device and at least a portion of sensors which are redundant to the first set of sensors, said bracelet being in electronic communication with the vehicle in a Wi-Fi or Bluetooth mode of operation to activate an alarm signal for requesting emergency intervention on behalf of the occupant when one of the one or more predetermined distress events is detected, said emergency intervention including sending a message to at least one of an emergency contact stored in the cell-phone of the occupant, the remote digital archive and operating centers of emergency-service providers and authorities; wherein said bracelet detects and monitors for malfunctioning of specific component elements of the system on-board the vehicle, and wherein at least one of said second set of sensors of the bracelet and bracelet data recording device are activated in order to compensate and guarantee operation of vehicle devices present on board the vehicle, the bracelet data recording device transmitting recorded data to the remote digital archive at predetermined intervals.

2. The system according to claim 1, further comprising means for remote instantaneous activation of a communication of the state of emergency of the vehicle in the passive condition, and where the vehicle is involved in one or more of the vehicle predetermined distress events including impact, theft, towing, vandalism and meteorological events, and automatically managing remotely, via said means for automatic driving and management of the vehicle, driving the vehicle.

3. The system according to claim 1, wherein in a case of an extraordinary meteorological event in which driving the vehicle by sight is prohibitive, said means for automatic driving and management of the vehicle activates and drives the vehicle safely to a closest lay-by or parking area.

4. The system according to claim 1, wherein said means for automatic driving and management of the vehicle selectively activates one or more airbags of the vehicle during an accident, and upon sudden damage to outer surfaces of the vehicle in the passive condition.

5. The system according to claim 1, wherein the vehicle further comprises an interface, management, and communication means for locating a nearby emergency center for sending health related data detected by the first and second sets of sensors for treatment at the emergency center.

6. The system according to claim 5, said interface, management and communications means sending communication signals to alert other vehicles traveling on a same and nearby roads in a vicinity of the vehicle, said other vehicles having the same or a similar system installed, wherein said alert signals to the other vehicles are lane clearing alerts; said interface, management and communications means sending control signals to traffic control devices to regulate traffic patterns on the same and nearby roads to facilitate clearing traffic; and said interface, management and communications means initiating light and/or acoustic alarm devices to alert other vehicles without said system installed.

7. The system according to claim 1, wherein said system is equipped with unique identification codes to enable identification of the vehicle and of its occupants, both when the vehicle is parked and when moving.

8. The system according to claim 1, wherein data recorded by the data recording devices in the vehicle and on the bracelet is instantaneously tele-transmitted to the remote archive for storage and retrieval.

9. The system according to claim 1, wherein the system comprises a second bracelet for monitoring health conditions of a second occupant in or near the vehicle wherein the data detected by each bracelet is transmitted to the remote digital archive.

10. The system according to claim 1, wherein the bracelet comprises one or more sensors and/or devices including an oxygen-level sensor, a body-temperature sensor, a blood-pressure sensor, an accelerometer, a gyroscope, an altimeter, a stress sensor, a sensor for detecting impaired driving, sensors for detecting biometric data, photovoltaic mini-cells, tags interfaced with said alarm means, Bluetooth and/or Wi-Fi interface, and automatic keys for opening/closing/starting the vehicle.

11. The system according to claim 1, wherein in a case of breakdown of the first and second sets of sensors, the system communicates electronically with public and/or private video cameras present in a vicinity of the vehicle.

12. The system according to claim 1, wherein the ultrasound sensors and/or means installed on outer surfaces of the vehicle detect imminent impact hazards and notify other drivers in nearby vehicles having said system.

13. The system according to claim 1 further comprising means for sending personal messages on a screen present in front of each of one or more occupants including a driver and additional passengers, in a confidential mode, via the sensors present in the vehicle, as well as via other internal devices and video cameras for detecting biometric data of the occupants.

14. The system according to claim 1 further comprising automatic intercommunication means for communicating with other vehicles when a driver performs a vehicle maneuver around said other vehicles on a road being traveled, and enabling a driver of the vehicle performing the maneuver to monitor traffic conditions developing in front of the other vehicles on a monitor on a dashboard or windscreen of the vehicle.

15. The system according to claim 14, wherein the vehicle is a motorcycle and said traffic conditions are displayed in a motorcycle helmet in electronic communication with said vehicle.

16. The system according to claim 1, wherein said vehicle is a truck or lorry, and said system further comprises means for automatic safe uncoupling of a trailer and parking.

17. The system according to claim 1, wherein the vehicle is a motorcycle and said system is installed in a motorcycle helmet that is in electronic communication with said bracelet.

18. The system according to claim 1, wherein the bracelet communicates with at least a second bracelet.

* * * * *